UNITED STATES PATENT OFFICE.

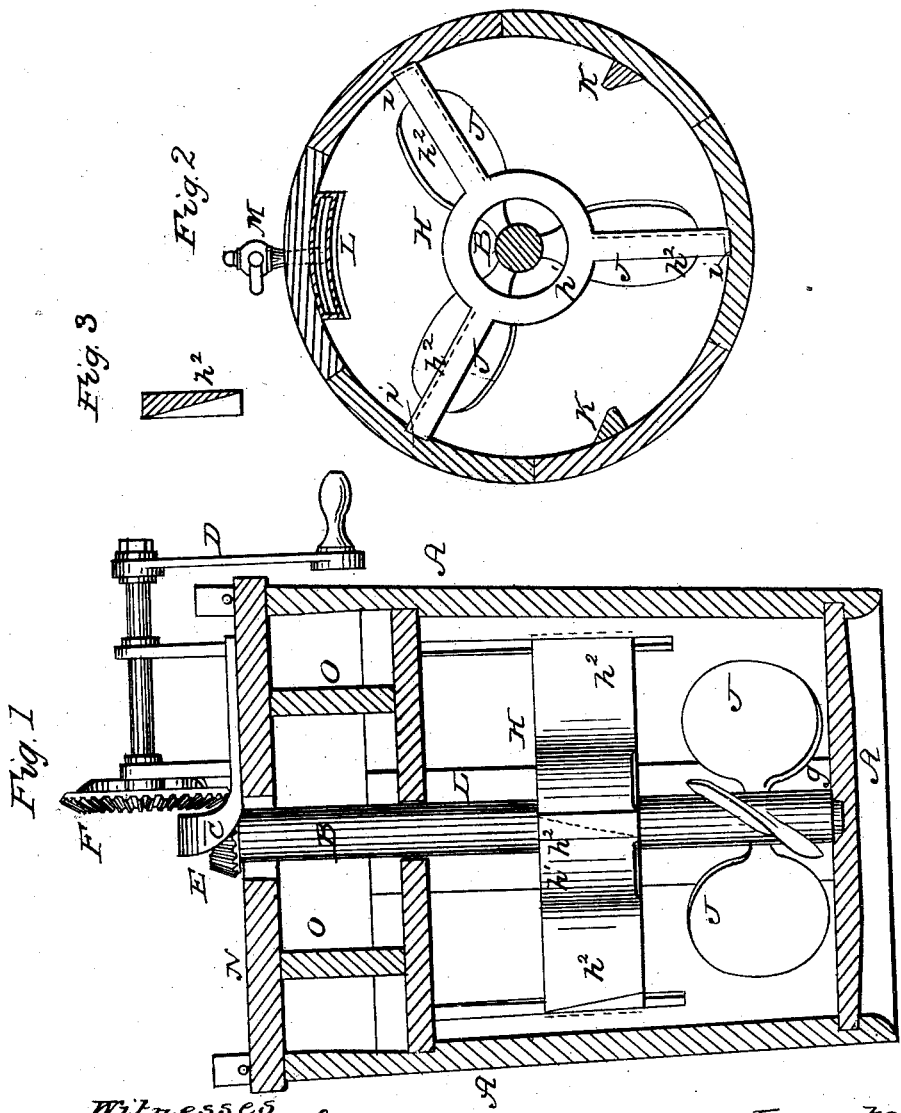

EDWARD LYNCH, OF BUFFALO, NEW YORK, ASSIGNOR TO HIMSELF AND JAS. J. McCOOL, OF SAME PLACE.

CHURN.

Specification of Letters Patent No. 27,864, dated April 10, 1860.

*To all whom it may concern:*

Be it known that I, EDWARD LYNCH, of the city of Buffalo, county of Erie, and State of New York, have invented new and useful Improvements in Churns; and I do hereby declare that the following is a full and exact description thereof, reference being had to the accompanying drawings and the letters of reference marked thereon, in which—

Figure I, is a vertical section of my improved churn. Fig. II, is a cross section of the same. Fig. III is a cross section of one of the radial arms of the breaker.

Letters of like name and kind refer to like parts in each of the figures.

A, represents a vessel or tub of ordinary form and construction into which the milk or cream is put for churning.

B, is a vertical spindle or shaft to which the dash blades are attached. This shaft is placed in the center of the churn, and has a step, or bearing in the bottom as shown at $g$, and also a journal bearing in the gear frame $c$ at the top. It is propelled by the crank D, and gearing E, F, in a common and well known manner.

H, represents a breaker of peculiar construction. It consists of a central ring $h'$ having radial arms $h^2$ which extend from the ring to the sides of the churn. Vertical grooves ($i$) are made in the sides of the churn to receive the ends of the these arms when the breaker is put into the churn, so that the breaker will not revolve, when the dash blades are put in motion. They fit loosely in the grooves, so as to allow the breaker to float, upon the milk or cream, and hence always retain the same relation to the milk or cream, whether there be a large or small quantity in the churn. For very large churns in which there is put a large quantity of milk or cream to be churned, two of these breakers may be used to advantage, in which case the lower one may be made stationary at a small distance above the dash blades by means of a key or wedge driven in between the end of one of the arms and the side of the churn, while the upper one is allowed to float upon the milk. These radial arms are beveled, their lower edge being the thinnest, as represented in Fig. III and one face of each arm being beveled to an opposite angle to that of the dash blade. The shaft passes through the ring as represented in the drawings.

The dash blades J, are made upon the principle of an ordinary propeller blade, and are attached to the shaft near the bottom thereof, so that their lower edges will revolve in close proximity to the bottom of the churn.

At K, are represented small stationary breaks of an ordinary kind which are made fast to the churn.

N, represents a cross piece which supports the gear frame. At O, are represented fingers which are connected to the cross piece, so that when the cross piece is in its place they will rest upon the top of the cover P, and hold it to its place.

At L, is represented a flat metal tube (or vessel) placed inside of the churn, into which warm or cold water may be put, for producing the required temperature in the milk or cream in the churn. It is held to the churn at the bottom by means of the screw faucet M. A screw thread is cut on the inner end of the faucet, and a corresponding screw or nut is made in the lower end of the tube, so that the faucet may serve the double purpose of holding the tube in its place and drawing off the milk after the butter has been gathered. Two or three screw turns of the faucet will be sufficient to connect it to the tube, and when it is desirable to remove the tube from the churn, the faucet may be unscrewed sufficient to release its hold upon the tube and the tube removed without allowing the milk to escape. The milk can then be drawn off through the faucet as desired and the water can be drawn from the tube before the tube is removed from the churn.

The operation of this churn is of the most satisfactory character. When the dash blades are put in motion, a current of air will be drawn through the ring, and a suction produced, which will draw the breaker into the milk just far enough to cause a portion of the milk to break over the ends of the arms and flow in different currents toward the central ring, and dive down toward the bottom of the churn tube again lifted by the dash blades and again broken against the arms while the counter currents and central draft through the ring will produce the most thorough agitation and ventilation of the milk, while the radial arms extending transversely across and floating so near the surface of the milk will prevent the milk from spattering or dashing over the top of the churn. This breaker will also produce the same effect, whether there be a large or small quantity of milk in the churn and the combined action of the propeller blades and floating breaker is such as to segregate the butter from the milk in the most perfect and satisfactory manner, and in the shortest possible time.

I am aware that fixed vertical breaks have been applied to prevent the rotation of the cream while under the action of a winged dasher rotating in a horizontal plane.

The following is what I claim as my invention herein and desire to secure by Letters Patent—

1. The floating break H, constructed with a central ring $h'$ and beveled radial arms $h^2$ operating in combination with vertical grooves $i$, in the sides of the churn in the manner and for the purposes explained.

2. The combination of the tube L and faucet M, constructed arranged and operating substantially as and for the purposes set forth.

EDWARD LYNCH.

Witnesses:
E. B. FORBUSH,
W. H. FORBUSH.